US010297928B2

(12) United States Patent
Sharawi et al.

(10) Patent No.: US 10,297,928 B2
(45) Date of Patent: May 21, 2019

(54) MULTI-PORT, MULTI-BAND, SINGLE CONNECTED MULTIPLE-INPUT, MULTIPLE-OUTPUT ANTENNA

(71) Applicant: King Fahd University of Petroleum and Minerals, Dhahran (SA)

(72) Inventors: Mohammad S Sharawi, Amman (JO); Muhammad Ikram, Okara (PK)

(73) Assignee: King Fahd University of Petroleum and Minerals, Dhahran (SA)

( * ) Notice: Subject to any disclaimer, the term of this patent is extended or adjusted under 35 U.S.C. 154(b) by 58 days.

(21) Appl. No.: 15/437,783

(22) Filed: Feb. 21, 2017

(65) Prior Publication Data

US 2018/0241136 A1 Aug. 23, 2018

(51) Int. Cl.

*H01Q 1/12* (2006.01)
*H01Q 1/48* (2006.01)

(Continued)

(52) U.S. Cl.

CPC .......... *H01Q 21/30* (2013.01); *H01Q 1/1207* (2013.01); *H01Q 1/48* (2013.01); *H01Q 5/314* (2015.01);

(Continued)

(58) Field of Classification Search

CPC .................................................. H01Q 13/106

(Continued)

(56) References Cited

U.S. PATENT DOCUMENTS 7,432,860 B2 10/2008 Huynh
7,864,126 B2 * 1/2011 Boisbouvier ............ H01Q 3/38 343/700 MS (Continued)

FOREIGN PATENT DOCUMENTS

WO 2016003173 A1 1/2016

OTHER PUBLICATIONS

Sharawi et al. "A Two Concentric Slot Loop Based Connected Array MIMO Antenna System for 4G/5G Terminals"; IEEE Transactions on Antennas and Propagation, vol. 65, No. 12, Dec. 2017; pp. 6679-6686 (Year: 2017).*

(Continued)

*Primary Examiner* — Ricardo I Magallanes
(74) *Attorney, Agent, or Firm* — Hauptham Ham, LLP

(57) ABSTRACT

A compact MIMO antenna system having connected arrays supporting multi-bands with multiple configurations. Two low band microwave MIMO antenna arrays operate at frequency bands below 6 GHz, and two high band microwave MIMO antenna arrays operate at frequencies above 10 GHz. The antenna arrays are connected together as connected arrays and support 4G as well as 5G bands. The antenna arrays are carried by an overlying layer of dielectric material and overlie two slots formed as rectangularly shaped closed loop in an underlying ground plane. The low band arrays each have a feeding arm that spans across the slots to act as a single antenna element, and the high band antenna arrays are power combiners/dividers with a single feeding point and four elements forming a two-to-one structure exciting the underlying slots, wherein the slots are excited and shared for compact design and wide operating bandwidth.

4 Claims, 5 Drawing Sheets
(5 of 5 Drawing Sheet(s) Filed in Color)

(51) Int. Cl.

| | |
|---|---|
| ***H01Q 5/35*** | (2015.01) |
| ***H01Q 9/04*** | (2006.01) |
| ***H01Q 9/16*** | (2006.01) |
| ***H04B 5/00*** | (2006.01) |
| ***H01Q 13/10*** | (2006.01) |
| ***H01Q 15/08*** | (2006.01) |
| ***H01Q 21/00*** | (2006.01) |
| ***H01Q 21/06*** | (2006.01) |
| ***H01Q 21/28*** | (2006.01) |
| ***H01Q 21/30*** | (2006.01) |
| ***H01Q 5/314*** | (2015.01) |

(52) U.S. Cl.
CPC ................. *H01Q 5/35* (2015.01); *H01Q 9/16* (2013.01); *H01Q 13/106* (2013.01); *H01Q 15/08* (2013.01); *H01Q 21/0006* (2013.01); *H01Q 21/0075* (2013.01); *H01Q 21/064* (2013.01); *H01Q 21/28* (2013.01); *H04B 5/00* (2013.01); *H01Q 9/0464* (2013.01)

(58) Field of Classification Search
USPC .................................................. 343/767, 769
See application file for complete search history.

(56) References Cited

U.S. PATENT DOCUMENTS

| | | | | |
|---|---|---|---|---|
| 8,669,914 | B2 | 3/2014 | Pan et al. | |
| 8,786,497 | B2 | 7/2014 | Sharawi | |
| 8,862,073 | B2 | 10/2014 | Erceg et al. | |
| 9,019,160 | B2 | 4/2015 | Sharawi et al. | |
| 9,368,869 | B2 | 6/2016 | Chen et al. | |
| 9,391,370 | B2 | 7/2016 | Tzanidis et al. | |
| 9,413,069 | B2 | 8/2016 | Chieh et al. | |
| 2015/0035714 | A1 | 2/2015 | Zhou | |
| 2015/0255856 | A1 * | 9/2015 | Hong ..................... | H01Q 1/243 343/702 |
| 2015/0364810 | A1 | 12/2015 | Yan et al. | |
| 2016/0006116 | A1 * | 1/2016 | Sharawi ............. | H01Q 21/0006 343/853 |
| 2016/0285161 | A1 | 9/2016 | Apaydin et al. | |

OTHER PUBLICATIONS

Ban, Y.L. et al., "4G/5G Multiple Antennas for Future Multi-Mode Smartphone Applications," IEEE Access, vol. 4 2016, pp. 2981-2988.

Hussain, R. et al., "A Compact 4G MIMO Antenna Integranted with a 5G Array for Current and Future Mobile Handsets," IET Microwaves, Antennas and Propagation, 2016, pp. 1-17.

* cited by examiner

MULTI-PORT, MULTI-BAND, SINGLE CONNECTED MULTIPLE-INPUT, MULTIPLE-OUTPUT ANTENNA

FIELD OF THE INVENTION

This invention relates generally to the field of wireless communication systems. More particularly, it relates to multiple-element, multiple-standard antenna configurations for user terminal devices and small form factor electronics. The antenna system of the invention is a multiple-input, multiple-output (MIMO) antenna that satisfies both fourth generation (4G) and 5G wireless communication bands with wide bandwidth.

BACKGROUND OF THE INVENTION

There is increasing interest in developing wideband and/or multiband antenna systems for use in wireless communications, microwave tomography, remote sensing, and other applications. This has led to increased demand for wideband microwave components, such as antennas. Current and upcoming wireless standards are pushing towards high data rates to accommodate, for example, video streaming and real-time online gaming. The next generation wireless standard will provide an increase in the overall channel capacity 1,000 times greater than current capacity, with multi-Giga bits per second expected to be a reality by the year 2020.

Future wireless standards will rely on novel technologies to increase the data rates and provide reliable links. Current fourth generation (4G) and upcoming 5G will rely on multiple antenna systems with multi-standard support. These multiple standards will operate in different frequency bands with enough frequency bandwidth to provide the expected high data throughput. Antenna elements are usually isolated from one another, and thus occupy a large space within a wireless terminal. The concept of connected arrays (CA) was recently introduced for single band coverage and with single arrays.

The use of multiple-input multiple-output (MIMO) technology as well as the use of higher frequency bands beyond those currently used for wireless communications (i.e. above 6 GHz) will be key factors in achieving the throughput increase. The user terminal will be allowed to carry up to 8-antenna elements within current cellular bands below 6 GHz, with a minimum of 4-antenna elements, depending on the device size and application.

Integrating higher frequency band antennas or antenna arrays along with MIMO antenna systems at the lower bands will be a must to satisfy the large increase in the data throughput expected, as bandwidths of at least 500 MHz are required, and these are not available in the lower spectrum bands.

Such integrated antenna systems that support multiple antennas as well as multiple standards with capabilities both less than 6 GHz and above 10 GHz are of extreme importance for upcoming wireless handheld devices to be able to achieve the expected performance of 5G standards.

Due to the use of multiple antennas in MIMO configurations, space becomes an issue, especially for lower frequency bands, as the antenna elements become larger in size. Coming up with novel compact size and highly efficient antennas is very desirable. At higher frequency bands, i.e. higher than 10 GHz, the free space attenuation of the radio signals becomes large, and thus antenna array configurations are preferred to provide higher gains and compensate for such losses.

The concept of connected antenna arrays (CA) was recently introduced for single band coverage and with single array elements. The idea is to forget the gap between the various antenna array elements, and connect them together in a single wire configuration. Then the feeding points are carefully identified to provide the resonance at the band of interest. This concept yields lower isolation between adjacent elements, but provides much larger operating bandwidths when compared to the conventional methods. Thus far, the concept of CA was applied on simple arrays of single bands and single feeding point.

U.S. Pat. No. 9,413,069 to Chieh et al. and U.S. Pat. No. 8,862,073 to Erceg et al. are exemplary of prior art devices.

Chieh et al. discloses a compact, multi-port, multi-band, Wi-Fi antenna system configured for high-isolation and improved performance. The antenna includes four monopole type antennas each having at least two resonances including 2.4 GHz and 5 GHz for use in Wi-Fi applications.

Erceg et al. discloses a configurable antenna structure including a plurality of switches, a plurality of antenna components, and a configuration module. The configuration module is operable to configure the plurality of switches and the plurality of antenna components into a first antenna for receiving a multiple frequency band multiple standard (MFBMS) signal. The configuration module continues processing by identifying a signal component of interest of a plurality of signal components of interest within the MFBMS signal. The configuration module continues processing by configuring the plurality of switches and the plurality of antenna components into a second antenna.

It would be advantageous to have a compact size MIMO antenna system based on connected arrays that supports multi-bands with multiple configurations. The antenna system of the invention can be placed on the periphery of any wireless terminal with minimum interference with other components within the device or even within the same chassis.

SUMMARY OF THE INVENTION

The present invention is a compact size, connected MIMO antenna system based on connected arrays that supports multi-bands with multiple configurations. The antenna system consists of microwave MIMO antenna arrays operating at frequency bands below 6 GHz as well as microwave MIMO antenna arrays operating at frequencies above 10 GHz, and up to mm-waves. The antenna arrays are connected/integrated together as connected arrays and support 4G as well as 5G bands.

The antenna system of the invention has at least two low band microwave MIMO antennas operating at less than 6 GHz, as well as at least two high band microwave antenna arrays operating above 10 GHz for supporting 5G bands with at least 1 GHz of bandwidth. The antenna system is compact and does not occupy much space in the system ground plane, making it very attractive for handheld and portable wireless terminals.

The antenna system is applied to a two-layer board with opposite side edges each having a length dimension and opposite end edges each having a width dimension, said length dimension being greater than the width dimension. The two-layer board comprises an underlying layer of electrically conductive material forming a ground plane, and an overlying layer of dielectric material. Two slots are formed as rectangularly shaped closed loops in the ground plane, said slots each having two long legs connected at their opposite ends by two short legs, said legs extending parallel to adjacent side and end edges, respectively, of the ground plane.

The low band MIMO antenna arrays comprise two antenna elements on the overlying layer, said antenna elements having feeding points and having feeding arms that overlie and span across the underlying slots in the ground plane to act as a single antenna element; and The high band MIMO antenna arrays comprise power combiners/dividers, each with a single feeding point and four elements, and each combiner is a two-to-one structure exciting the underlying slots in the ground plane with quarter guided wavelength design at the desired frequency of operation, wherein the slots are excited and shared for compact design and wide operating bandwidth.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing, as well as other objects and advantages of the invention, will become apparent from the following detailed description when taken in conjunction with the accompanying drawings, wherein like reference characters designate like parts throughout the several views, and wherein.

DETAILED DESCRIPTION OF THE PREFERRED EMBODIMENTS

Figure 1A:
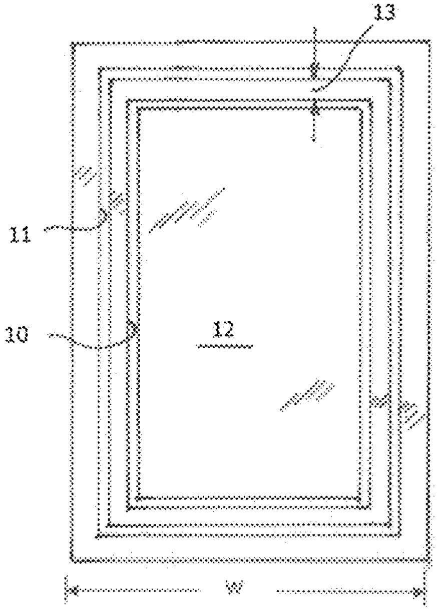
FIGS. 1A and 1B show the geometry of the multi-wide-band antenna configuration of the invention, based on a dual-slot connected array.
Figure 1B:
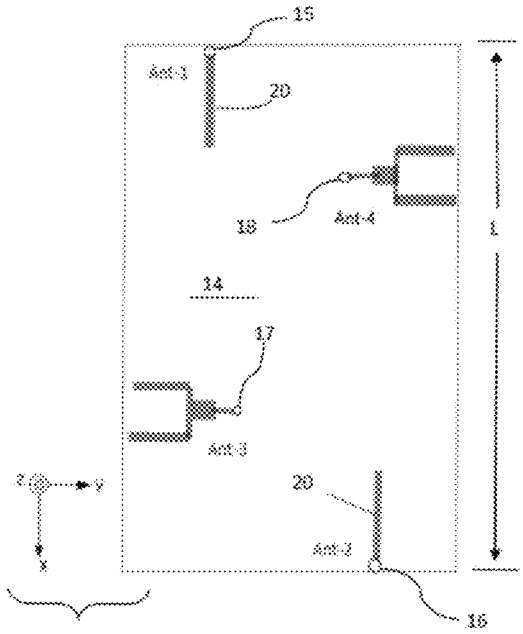

FIGS. 1A and 1B show the geometry of the proposed multi-antenna, multi-wide-band antenna configuration based on a dual-slot connected array (CA).

As seen in FIG. 1A, two parallel spaced apart slots 10 and 11 are formed in the bottom metallic layer 12 of any wireless device backplane (ground plane). The slots extend parallel to adjacent side and end edges of the backplane in closed, rectangularly shaped loops so that each slot loop has two long legs connected at their opposite ends by two short legs. Usually there is no restriction or relationships between the short and long legs, but the relationship in the present invention is for a standard mobile phone terminal device where the shape is rectangular with two long legs and two short legs. The location of the antennas Ant-1, Ant-2, Ant-3 and Ant-4, described in more detail hereinafter, is selected to control the direction of the radiated field maximum power.

In the particular construction disclosed herein, applicants chose opposite sizes for the MIMO configurations of the 4G band (top and bottom legs) and the 5G band (left and right legs). This arrangement tilts the beams with respect to one another and provides better MIMO characteristics via the lower correlation coefficient values.

In a preferred example, the backplane layer 12 is made of copper. The separation 13 between the two rectangular slots is optimized for the targeted bands. The width of the two slots is also a design parameter and in this case does not exceed 1 mm. This is a main feature for compact size of such an integrated antenna solution. The width W and length L of the two-layer board that is used can vary based on the device under consideration (e.g. 100 mm×65 mm for a smart phone design). This is related to the discussion in the paragraph immediately above. For connected arrays, several antennas can generally be arrayed next to one another with a connected configuration. The advantage is the wide bandwidth achieved. The disadvantage is the high coupling and thus lower efficiency of radiation. That is why connected antennas are used in array configurations. In the present case, the antennas are separated spatially and acceptable performance is achieved. In other designs, isolation enhancement mechanisms can be included to improve port isolation between adjacent antennas.

FIG. 1B shows the feeding structures for the antenna elements, and their port locations. In a preferred embodiment of the invention, the substrate 14 is made of a dielectric material with dielectric constant of 3.6 and loss tangent of 0.001, but the two-layer board can comprise any commercial substrate material.

The lower band MIMO antenna system consists of two elements, Ant-1 and Ant-2, with input feeding points at 15 and 16, respectively. The two lower band feeding arms 20 excite the underlying slots 10 and 11 in the backplane 12 to act as a single antenna element.

The antenna arrays for the higher frequency bands use power combiners/dividers for Ant-3 and Ant-4, each with a single feeding point 17 or 18, respectively. The arrays in this design consist of four elements in each, as each combiner is a two-to-one structure exciting the underlying slots 10 and 11 on the GND plane with quarter guided wavelength design at the desired frequency of operation. The excited slots 10 and 11 are shared for compact design and wide operating bandwidth.

Figure 2A:
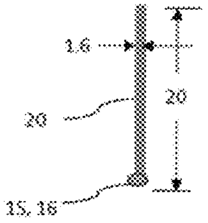
FIGS. 2A and 2B are enlarged views of the feed point structures for the two major bands.
Figure 2B:
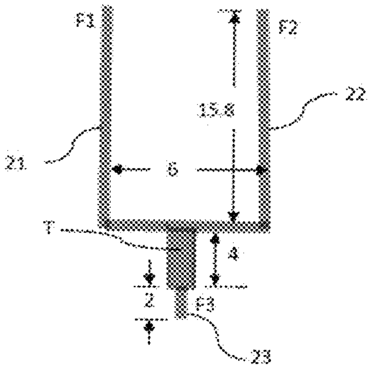

A closer look at the feeding structures for the two major bands is shown in FIGS. 2A and 2B. As shown in FIG. 2A, for the lower band MIMO antenna system, a simple microstrip rectangular line 20 with length and width according to the thickness and material of the substrate 14 to match to 50 ohms is used to excite the two slots in the ground plane. The feeding point is on its lower end 15 or 16. The microstrip feeding line 20 should have a width that corresponds to the characteristic impedance of the transmission line for the specific substrate type used as well as its thickness. Since the feeding port is 50 ohms in the particular example disclosed herein, the microstrip feeding line should have 50 ohms characteristic impedance as well for proper impedance matching. Also, the length of the line is optimized to provide proper impedance matching with the antenna element itself (for matching from the other end of the line, as the width is needed for matching with the connector port). Thus, in the particular example shown and described herein, the microstrips 20 each have a length of 20 mm and a width of 1.6 mm.

Figure 2C:
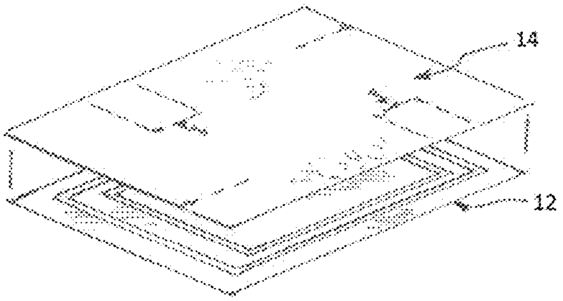
FIG. 2C is a somewhat schematic isometric exploded view showing generally the relationship of the top and bottom layers of the two-layer board of the invention.

FIG. 2B shows a two-to-one combiner/splitter power divider as used for the higher band (up to millimeter wave frequencies) excitation. Each divider has generally the shape of a tuning fork with two parallel spaced apart arms 21 and 22 that excite the underlying slots to form a four-element planar array. The arms are joined to a transition T that has a single feeding point 23 at an input port, the transition matching the impedance of the input port and the two power divider arms 21 and 22. The power dividers excite the four slots underneath to form a 4-element planar array (See FIG. 2C). The feeding point 23 is used and the matching transition T matches the impedance of the input port and the two power divider arms.

FIG. 2B shows the detailed dimensions of the power combiner/splitter microstrip feeding structure according to the specific example disclosed herein. The input of the feeding structure is connected to the input port which is also a 50 ohm port. The width of the lines should correspond to the appropriate impedance for that structure. Thus, in this example a length of 15.8 mm is chosen to have proper impedance matching with the antenna input (the two slot lines beneath). The length of 4 mm corresponds to quarter wavelength of the guided wave at the 5G band, and the 6 mm dimension is chosen for having quarter wavelength separation between the two antenna elements within the array. All these dimensions should follow impedance matching rules, and the power combiner impedance transformations based on the guided wave under consideration. If the substrate is changed these values will change, but should follow the rules mentioned above. The 2 mm at the input is used to match the input port and provide connectivity with the power combiner circuit. Feed arm 1, feed arm 2 and feed arm 3 are indicated by F1, F2 and F3, respectively.

Figure 3A:
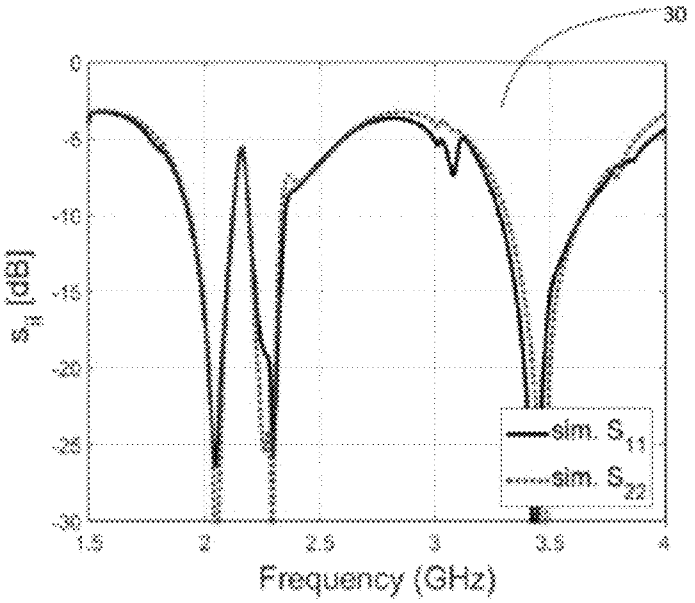
FIGS. 3A and 3B are plots of the port results obtained with the system of the invention.
Figure 3B:
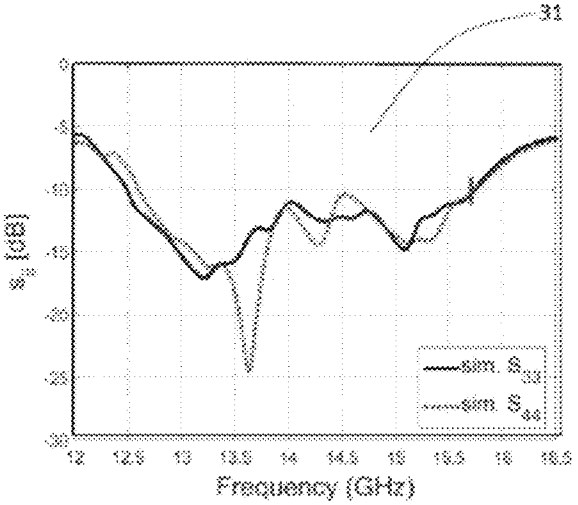

The obtained port results are shown in FIGS. 3A and 3B. FIG. 3A shows the resonance behavior and obtained bandwidth 30 from the lower band antennas (Ant-1 and Ant-2). As can be seen, multiple wide-bands are covered by the two lower band antennas. The bands covered in this configuration can be changed according to the design requirements by changing the slot width, inter-slot spacing, etc. In the example disclosed herein they were 1936-2123 MHz, 2191-2347 MHz and 3321-3653 MHz, with −10 dB bandwidths of 187 MHz, 156 MHz and 332 MHz, respectively. More than 500 MHz in each of the three bands is obtained if the −6 dB bandwidth is considered. The very wide bandwidths obtained are essential for future wireless standards to support higher data rates as well as backward compatibility with current standards (i.e. 4G).

The higher band response 31 for Ant-3 and Ant-4 in FIG. 3B shows the coverage of a very wide band for 5G applications spanning 12.62-15.73 GHz, with an operating −10 dB bandwidth of 3.11 GHz. If −6 dB bandwidth is considered, the bandwidth increases to more than 4.5 GHz.

Figure 4A:
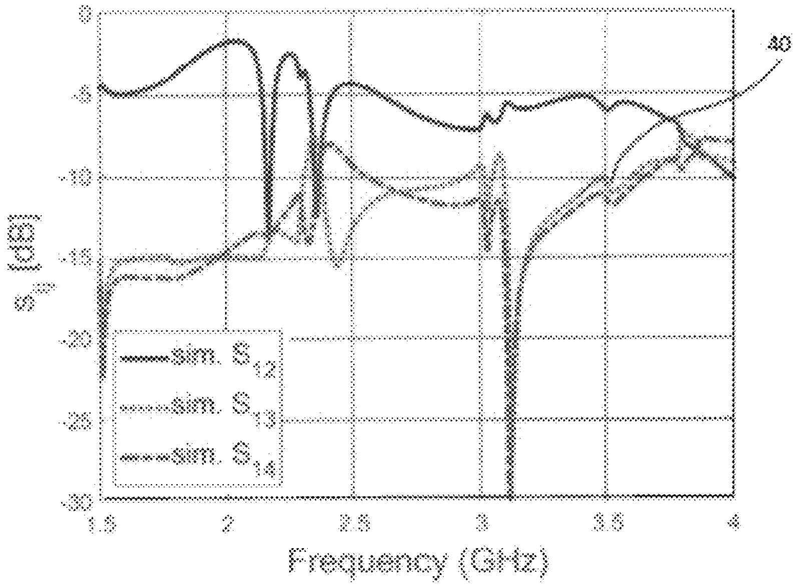
FIGS. 4A and 4B are plots of the port isolation curves between the various antennas.
Figure 4B:
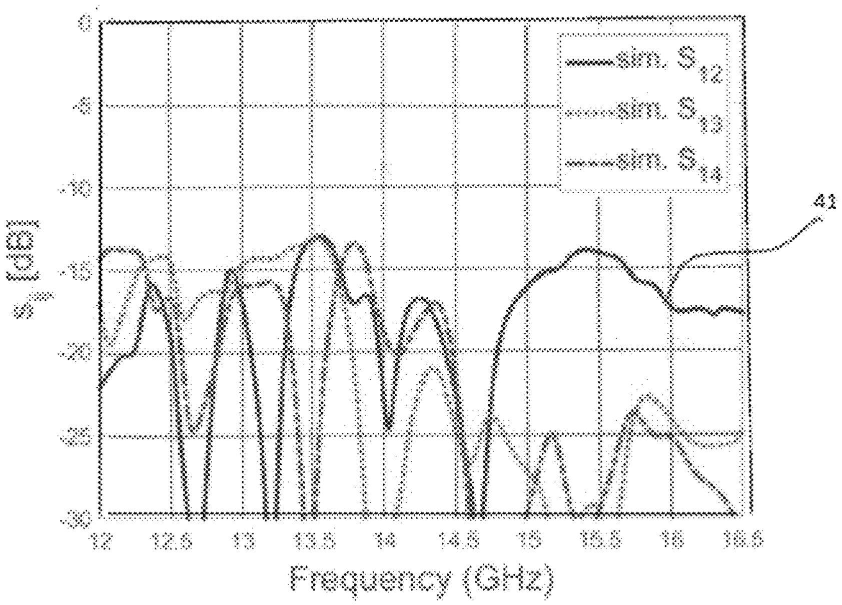

Port isolation curves between the various antennas are shown in FIGS. 4A and 4B. FIG. 4A shows the curve 40 for the lower band, and FIG. 4B shows the curve 41 for the higher band. In the lower band, high coupling is observed on the band edges of the lower band antenna elements Ant-1 and Ant-2. In the higher band, low coupling is observed. It should be noted that the antennas are connected to one another, and thus the coupling levels are expected to be higher in this configuration, but the added value is in the bandwidth and multiband and small size obtained with the configuration of the invention.

Figure 5A:
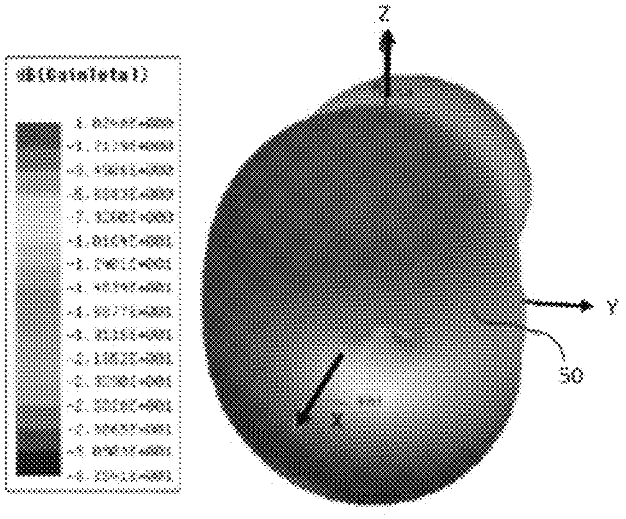
FIGS. 5A and 5B show the three-dimensional gain patterns for the lower band antennae 501 and 502, respectively.
Figure 5B:
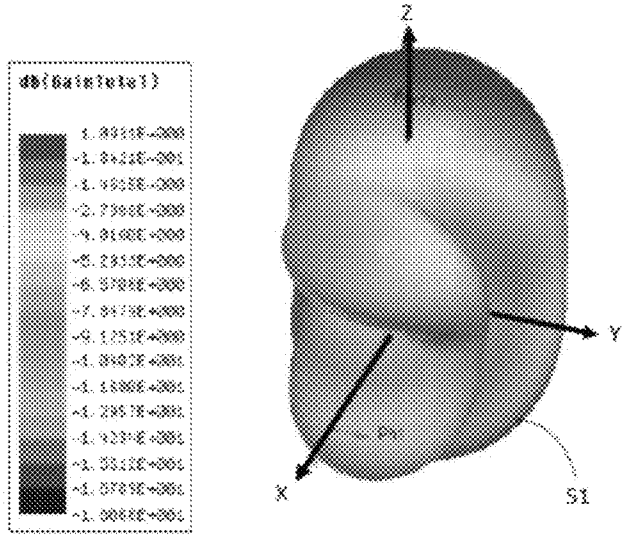

The three dimensional (3D) gain patterns 50 and 51 for the lower band antennas Ant-1 and Ant-2 are shown in FIGS. 5A and 5B, respectively. More than 1 dBi of gain is obtained from each antenna. Also, the maximum radiation patterns are in opposite directions, thus ensuring low envelope correlation coefficient values, and thus very good MIMO performance.

Figure 6A:
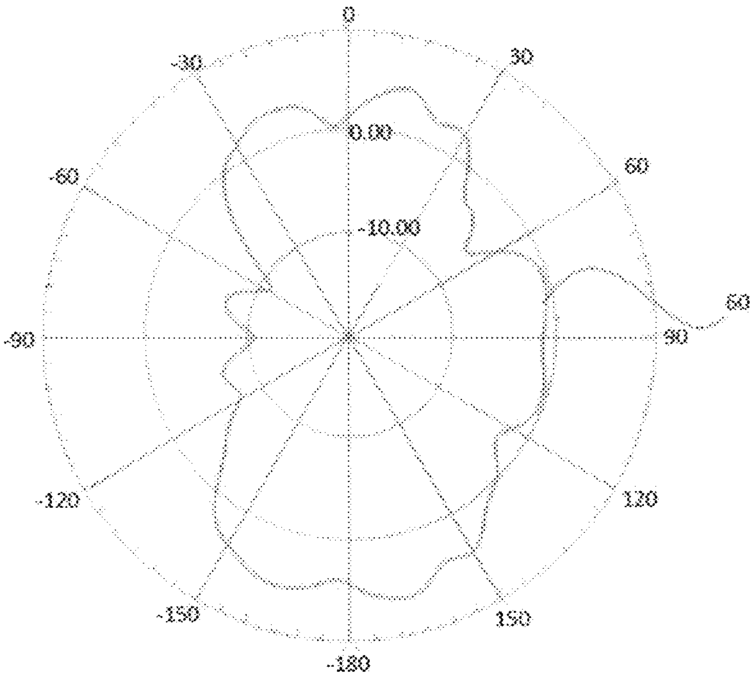
FIGS. 6A and 6B show the two-dimensional radiation patterns in one principle plane of antennae 600 and 601, respectively.
Figure 6B:
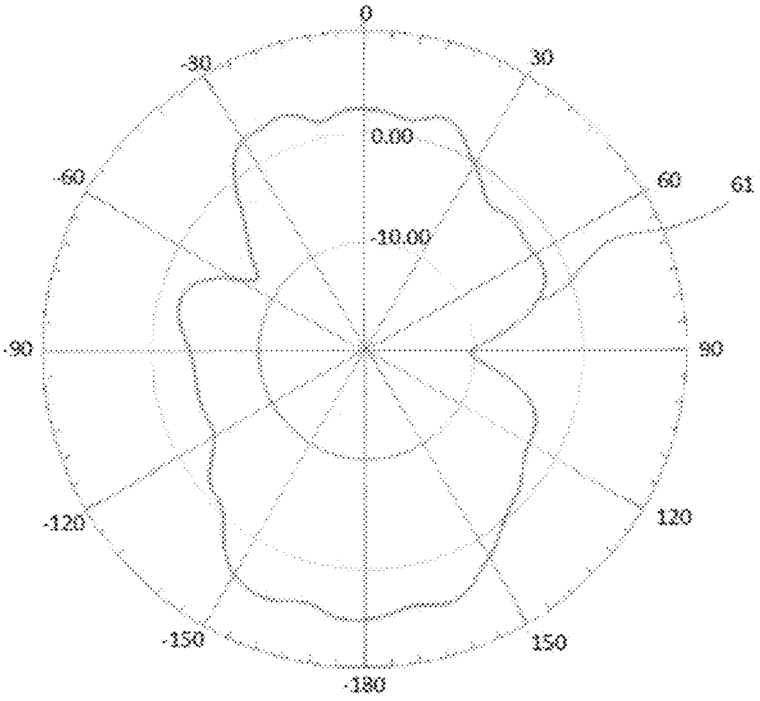

FIGS. 6A and 6B show the two-dimensional (2D) radiation patterns 60 and 61 in one principal plane of Ant-3 and Ant-4, respectively. Gain values of more than 5 dBi are obtained from each array.

While the invention has been described in connection with its preferred embodiments, it should be recognized that changes and modifications may be made therein without departing from the scope of the claims.

What is claimed is:

1. A compact connected MIMO antenna system having connected arrays supporting multi-bands with multiple configurations, comprising:

low band microwave MIMO antenna arrays operating at frequency bands below 6 GHz; and high band microwave MIMO antenna arrays operating at frequencies above 10 GHz, wherein the antenna arrays are connected together as connected arrays and support 4G as well as 5G bands, wherein;

the antenna system is applied to a two-layer board with opposite side edges each having a length dimension and opposite end edges each having a width dimension, said length dimension being greater than the width dimension;

said two-layer board comprises an underlying layer of electrically conductive material forming a ground plane, and an overlying layer of dielectric material;

two slots are formed as rectangularly shaped closed loops in the ground plane, said slots each having two long legs connected at their opposite ends by two short legs, said legs extending parallel to adjacent side and end edges of the ground plane;

the low band MIMO antenna arrays comprise two antenna elements on the overlying layer, said antenna elements having feeding points and having feeding arms that overlie and span across the underlying slots in the ground plane to act as a single antenna element; and the high band MIMO antenna arrays comprise power combiners/dividers, each with a single feeding point and four elements, and each combiner is a two-to-one structure exciting the underlying slots in the ground plane with quarter guided wavelength design at the desired frequency of operation, wherein the slots are excited and shared for compact design and wide operating bandwidth.

2. The antenna system as claimed in claim 1, wherein:

each divider has generally the shape of a tuning fork with two parallel spaced apart arms that excite the underlying slots to form a four-element planar array, said arms being joined to a transition that has a single feeding point at an input port, said transition matches the impedance of the input port and the two power divider arms.

3. The antenna system as claimed in claim 2, wherein:

said dividers are positioned adjacent the side edges of the two-layer board.

4. The antenna system as claimed in claim 3, wherein:

the low band MIMO antenna system comprises a simple microstrip rectangular line with length and width according to the thickness and material of the overlying layer of the two-layer board to match to 50 ohms, with a feeding point on an end thereof adjacent a respective end edge of the two-layer board.

* * * * *